United States Patent
Ciochina

(10) Patent No.: US 11,064,489 B2
(45) Date of Patent: Jul. 13, 2021

(54) METHOD AND TRANSMITTER FOR RESOURCE ALLOCATION IN CARRIER

(71) Applicant: MITSUBISHI ELECTRIC CORPORATION, Tokyo (JP)

(72) Inventor: Cristina Ciochina, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 171 days.

(21) Appl. No.: 16/334,674

(22) PCT Filed: Nov. 1, 2017

(86) PCT No.: PCT/JP2017/040342
§ 371 (c)(1),
(2) Date: Mar. 19, 2019

(87) PCT Pub. No.: WO2018/084323
PCT Pub. Date: May 11, 2018

(65) Prior Publication Data
US 2020/0374092 A1 Nov. 26, 2020

(30) Foreign Application Priority Data

Nov. 4, 2016 (EP) .................................... 16306449
Feb. 15, 2017 (EP) .................................... 17305171

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0007* (2013.01); *H04L 5/0039* (2013.01);
(Continued)

(58) Field of Classification Search
CPC ....... H04L 5/0007; H04L 5/001; H04L 5/003; H04L 5/0037; H04L 5/0039;
(Continued)

(56) References Cited

U.S. PATENT DOCUMENTS 8,340,037 B2 * 12/2012 Dai ....................... H04L 5/0094
370/329
8,780,816 B2 * 7/2014 Montojo ............... H04W 72/04
370/329
(Continued)

FOREIGN PATENT DOCUMENTS

BR 112019013313 A2 * 12/2019 ............ H04W 88/02
BR 112019015909 A2 * 3/2020 ........ H04W 72/0453
(Continued)

OTHER PUBLICATIONS

Ericsson, Feasibility of Mixing Numerology in an OFDM System, Apr. 11, 2016, 3GPP, 3GPP TSG RAN WG1 Meeting #84bis, Tdoc: R1-163224 (Year: 2016).*

(Continued)

*Primary Examiner* — Eric Nowlin
(74) *Attorney, Agent, or Firm* — Birch, Stewart, Kolasch & Birch, LLP

(57) ABSTRACT

The invention relates to allocating resources in a carrier when several subcarrier spacing configurations coexists, and more particularly to avoid or at least reduce the loss of resources when allocating in such a carrier. The invention proposes to align contiguous resource blocks ($RB_1$) of a subcarrier spacing configuration ($f_1$) on a raster of a different subcarrier spacing configuration ($f_0$). Therefore the invention proposes a method to allocate such resource blocks to a terminal.

16 Claims, 4 Drawing Sheets

(51) Int. Cl.
*H04W 72/12* (2009.01)
*H04L 27/26* (2006.01)
*H04W 84/04* (2009.01)

(52) U.S. Cl.
CPC .......... *H04L 5/0066* (2013.01); *H04L 5/0092* (2013.01); *H04L 5/0094* (2013.01); *H04L 27/2602* (2013.01); *H04L 27/2666* (2013.01); *H04W 72/0406* (2013.01); *H04W 72/12* (2013.01); *H04L 5/001* (2013.01); *H04L 5/0037* (2013.01); *H04W 72/04* (2013.01); *H04W 72/1278* (2013.01); *H04W 84/042* (2013.01)

(58) Field of Classification Search
CPC ... H04L 5/0066; H04L 5/0092; H04L 5/0094; H04L 27/2602; H04L 27/2666; H04L 41/0896; H04W 72/04; H04W 72/0406; H04W 72/0453; H04W 72/12; H04W 72/1278; H04W 84/042
See application file for complete search history.

(56) References Cited

U.S. PATENT DOCUMENTS

| | | | | |
|---|---|---|---|---|
| 9,629,142 | B2* | 4/2017 | Zhang | H04W 72/1289 |
| 9,820,281 | B1* | 11/2017 | Werner | H04W 72/0453 |
| 10,009,280 | B2* | 6/2018 | Weitzman | H04L 47/24 |
| 10,021,689 | B2* | 7/2018 | Webb | H04W 72/042 |
| 10,111,229 | B2* | 10/2018 | Werner | H04W 72/0453 |
| 10,320,512 | B2* | 6/2019 | Nammi | H04L 27/2657 |
| 10,455,600 | B2* | 10/2019 | Lee | H04W 72/1205 |
| 10,575,306 | B2* | 2/2020 | Werner | H04L 5/0007 |
| 10,575,308 | B2* | 2/2020 | Wei | H04L 5/0039 |
| 10,630,525 | B2* | 4/2020 | Abdoli | H04L 27/2666 |
| 10,667,255 | B2* | 5/2020 | Awad | H04L 5/0053 |
| 10,728,079 | B2* | 7/2020 | Abdoli | H04L 5/0092 |
| 10,742,343 | B2* | 8/2020 | Nammi | H04L 27/2691 |
| 10,756,838 | B2* | 8/2020 | Jiang | H04L 5/0094 |
| 10,764,099 | B2* | 9/2020 | Park | H04L 27/2607 |
| 10,841,948 | B2* | 11/2020 | Zhang | H04L 1/1819 |
| 10,868,702 | B2* | 12/2020 | Park | H04L 27/2607 |
| 2010/0040001 | A1* | 2/2010 | Montojo | H04W 74/006 370/329 |
| 2011/0122830 | A1* | 5/2011 | Dai | H04L 5/0039 370/329 |
| 2012/0275413 | A1* | 11/2012 | Hong | H04L 5/0041 370/329 |
| 2015/0009939 | A1* | 1/2015 | Zhang | H04W 72/1289 370/329 |
| 2016/0119239 | A1* | 4/2016 | Weitzman | H04L 47/125 370/230.1 |
| 2016/0150533 | A1* | 5/2016 | Webb | H04W 72/042 370/329 |
| 2017/0318588 | A1* | 11/2017 | Inoue | H04L 5/0007 |
| 2017/0325213 | A1* | 11/2017 | Wei | H04W 72/042 |
| 2017/0332378 | A1* | 11/2017 | Werner | H04L 5/0007 |
| 2018/0014303 | A1* | 1/2018 | Webb | H04W 72/0446 |
| 2018/0098337 | A1* | 4/2018 | Lee | H04W 72/1278 |
| 2018/0124791 | A1* | 5/2018 | Werner | H04W 72/042 |
| 2018/0192409 | A1* | 7/2018 | Yang | H04W 72/044 |
| 2018/0198548 | A1* | 7/2018 | Nammi | H04L 27/2691 |
| 2018/0220404 | A1* | 8/2018 | Awad | H04W 72/042 |
| 2018/0270093 | A1* | 9/2018 | Lopez | H04L 5/0028 |
| 2019/0059087 | A1* | 2/2019 | Werner | H04W 72/0453 |
| 2019/0149257 | A1* | 5/2019 | Jiang | H04L 5/0094 370/342 |
| 2019/0215216 | A1* | 7/2019 | Abdoli | H04L 27/2666 |
| 2019/0245727 | A1* | 8/2019 | Park | H04L 27/2607 |
| 2019/0253171 | A1* | 8/2019 | Nammi | H04L 27/2657 |
| 2019/0313438 | A1* | 10/2019 | Zhang | H04L 5/0094 |
| 2019/0349241 | A1* | 11/2019 | Abdoli | H04L 27/266 |
| 2020/0059390 | A1* | 2/2020 | Zhang | H04L 1/0004 |
| 2020/0100273 | A1* | 3/2020 | Gao | H04W 72/1284 |
| 2020/0214003 | A1* | 7/2020 | Webb | H04W 72/042 |
| 2020/0267731 | A1* | 8/2020 | Werner | H04W 72/042 |
| 2020/0274671 | A1* | 8/2020 | Behravan | H04L 5/0007 |
| 2020/0274683 | A1* | 8/2020 | Xia | H04L 5/0044 |
| 2020/0275472 | A1* | 8/2020 | Gao | H04L 1/1812 |
| 2020/0336249 | A1* | 10/2020 | Yl | H04L 5/00 |
| 2020/0351044 | A1* | 11/2020 | Hessler | H04L 5/0048 |
| 2020/0351134 | A1* | 11/2020 | Park | H04L 27/2607 |
| 2020/0351668 | A1* | 11/2020 | Kundu | H04L 5/0092 |
| 2020/0374918 | A1* | 11/2020 | Ang | H04L 1/1642 |

FOREIGN PATENT DOCUMENTS

| | | | | |
|---|---|---|---|---|
| CN | 108141302 A | * | 6/2018 | ........ H04L 27/2602 |
| CN | 108513730 A | * | 9/2018 | ........... H04L 5/0044 |
| CN | 110447194 A | * | 11/2019 | ........ H04W 72/0453 |
| CN | 110463152 A | * | 11/2019 | ........... H04L 5/0092 |
| CN | 110771107 A | * | 2/2020 | ........ H04W 72/1284 |
| CN | 111466147 A | * | 7/2020 | ......... H04L 27/2675 |
| EP | 2 830 378 A1 | | 1/2015 | |
| EP | 3319264 A1 | * | 5/2018 | ........... H04L 5/0007 |
| EP | 3338385 A1 | * | 6/2018 | .......... H04J 13/0003 |
| EP | 3375127 A1 | * | 9/2018 | ......... H04L 5/0028 |
| EP | 3375127 A4 | * | 11/2018 | ............. H04J 11/00 |
| EP | 3338385 A4 | * | 5/2019 | ........... H04L 5/0094 |
| EP | 3375127 B1 | * | 6/2019 | ........... H04L 5/0037 |
| EP | 3549376 A1 | * | 10/2019 | ........... H04L 5/0044 |
| EP | 3568960 A1 | * | 11/2019 | ........... H04L 5/0092 |
| EP | 3577825 A1 | * | 12/2019 | ........ H04W 72/0453 |
| EP | 3319264 B1 | * | 3/2020 | ........... H04L 5/0039 |
| EP | 3639492 A1 | * | 4/2020 | ........... H04L 1/1812 |
| EP | 3549376 A4 | * | 6/2020 | ........... H04L 5/0091 |
| EP | 3639492 A4 | * | 6/2020 | ........ H04W 72/0413 |
| KR | 20180026604 A | * | 3/2018 | |
| KR | 20190105239 A | * | 9/2019 | ........... H04L 5/0053 |
| MX | 2019009014 A | * | 1/2020 | ........ H04W 72/0453 |
| WO | WO 2016/130175 A1 | | 8/2016 | |
| WO | WO-2016130175 A1 | * | 8/2016 | ........... H04L 5/0092 |
| WO | WO-2017082793 A1 | * | 5/2017 | ......... H04L 27/2602 |
| WO | WO-2017209585 A1 | * | 12/2017 | ............... H04L 5/00 |
| WO | WO-2018023364 A1 | * | 2/2018 | ......... H04L 27/2602 |
| WO | WO-2018121495 A1 | * | 7/2018 | ........... H04L 5/0091 |
| WO | WO-2018142202 A1 | * | 8/2018 | ........... H04L 5/0007 |
| WO | WO-2018182477 A1 | * | 10/2018 | ........... H04L 5/0092 |
| WO | WO-2018227498 A1 | * | 12/2018 | ........ H04L 27/2656 |
| WO | WO-2019137311 A1 | * | 7/2019 | ............... H04L 7/10 |

OTHER PUBLICATIONS

Ericsson, Mixed Numerology in an OFDM System, Apr. 11, 2016, 3GPP, 3GPP TSG RAN WG1 Meeting #85, Tdoc: R1-164623 (Year: 2016).*
ETRI, On Design of Mixed Numerology in a NR Carrier, Aug. 22, 2016, 3GPP, 3GPP TSG RAN WG1 Meeting #86, Tdoc: R1-166941 (Year: 2016).*
Ericsson, On resource allocation and guard subcarriers for mixed numerologies, Aug. 22, 2016, 3GPP, 3GPP TSG RAN WG1 Meeting #86, Tdoc: R1-167033 (Year: 2016).*
Nokia et al., Resource block and guard band arrangement supporting mixed numerology, Aug. 22, 2016, 3GPP, 3GPP TSG RAN WG1 Meeting #86, Tdoc: R1-167260 (Year: 2016).*
Nokia et al., On resource block grouping and multi-cell coordination aspects for mixed numerology support, Aug. 22, 2016, 3GPP, 3GPP TSG RAN WG1 Meeting #86, Tdoc: R1-167261 (Year: 2016).*
ZTE et al., Way Forward on RB allocation for mixed numerologies, Aug. 22, 2016, 3GPP, 3GPP TSG RAN WG1 #86, Tdoc: R1-167929 (Year: 2016).*
ZTE et al., Way Forward on RB allocation for mixed numerologies, Aug. 22, 2016, 3GPP, 3GPP TSG RAN WG1 #86, Tdoc: R1-167956 (Year: 2016).*
ZTE et al., Way Forward on RB allocation for mixed numerologies, Aug. 22, 2016, 3GPP, 3GPP TSG RAN WG1 #86, Tdoc: R1-167978 (Year: 2016).*
ZTE et al., Way Forward on RB allocation for mixed numerologies, Aug. 22, 2016, 3GPP, 3GPP TSG RAN WG1 #86, Tdoc: R1-168140 (Year: 2016).*

(56) References Cited

OTHER PUBLICATIONS

ZTE et al., Way Forward on RB grid definition for mixed numerologies, Aug. 22, 2016, 3GPP, 3GPP TSG RAN WG1 #86, Tdoc: R1-168309 (Year: 2016).*
Fujitsu, TDD Frame Structure with Mixed Numerology, Oct. 10, 2016, 3GPP, 3GPP TSG RAN WG1 #86bis, Tdoc: R1-1608807 (Year: 2016).*
Samsung, RB Grid for Mixed Numerology, Oct. 10, 2016, 3GPP, 3GPP TSG RAN WG1 #86bis, Tdoc: R1-1609045 (Year: 2016).*
Huawei et al., Discussion on UE Behavior on Mixed Numerology Carrier, Oct. 10, 2016, 3GPP, 3GPP TSG RAN WG1 #86bis, Tdoc: R1-1609425 (Year: 2016).*
Ericsson, On RB Structure for Mixed Numerologies, Oct. 10, 2016, 3GPP, 3GPP TSG RAN WG1 #86bis, Tdoc: R1-1609625 (Year: 2016).*
Nokia et al., Intra-carrier Sub-band for Mixed Numerology, Oct. 10, 2016, 3GPP, 3GPP TSG RAN WG1 #86bis, Tdoc: R1-1609660 (Year: 2016).*
Qualcomm Incorporated, NR Numerology Scaling and Alignment, Oct. 10, 2016, 3GPP, 3GPP TSG RAN WG1 #86bis, Tdoc: R1-1610131 (Year: 2016).*
Panasonic, Resource Assignment for Mixed Numerologies, Oct. 10, 2016, 3GPP, 3GPP TSG RAN WG1 #86bis, Tdoc: R1-1610217 (Year: 2016).*
NEC, Remaining Issues on Mixed Numerology in a Single Carrier, Nov. 14, 2016, 3GPP, 3GPP TSG RAN WG1 #87, Tdoc: R1-1611715 (Year: 2016).*
Nokia et al., Intra-carrier Sub-band for Mixed Numerology, Nov. 14, 2016, 3GPP, 3GPP TSG RAN WG1 #87, Tdoc: R1-1612267 (Year: 2016).*
AT&T, Resource Partitioning with Mixed Numerology, Nov. 14, 2016, 3GPP, 3GPP TSG RAN WG1 #87, Tdoc: R1-1612363 (Year: 2016).*
Ericsson, "Mixed Numerology in an OFDM System", 3GPP TSG RAN WG1 Meeting #85, R1-165833. Nanjing, May 23-27, 2016, 11 pages.
Japanese Office Action for Japanese Application No. 2018-568985, dated Jan. 28, 2020, with English translation.
ZTE et al., "About RB Grid Definition and Handling Inter-numerology Interference in NR," 3GPP TSG-RAN WG1 Meeting #86bis, R1-1608963, Lisbon, Portugal, Oct. 10-14, 2016, 9 pages.
Alcatel-Lucent Shanghai Bell et al., "Design of Scheduling Assignment", 3GPP TSG RAN WG1 Meeting #77, R1-142050, Seoul, Korea, May 19-May 23, 2014, 4 pages.
Anritsu Ltd. et al., "Update 7.1.7.x test cases with UE Category 11 and 12 information", 3GPP TSG-RAN WG5 Meeting #69, R5-155783, Anaheim, USA, Nov. 16-20, 2015, 98 pages.
Gerstenberger, "Introduction to LTE-Advanced", LTE the UMTS Long Term Evolution from Theory to Practice, Ed. Stefania Sesia et al., Jun. 1, 2011, p. 618.
Panasonic, "Resource allocation of PDSCH for Rel.13 MTC", 3GPP TSG RAN WG1 Meeting #83, R1-156946, Anaheim, USA, Nov. 15-22, 2015, 3 pages.
Qualcomm Europe, "LS Response to Semi-Persistent Scheduling Activation with single PDCCH", 3GPP TSG RAN WG1 Meeting #54bis, R1-083782, Prague, Czech, Sep. 29-Oct. 3, 2008, 2 pages.

* cited by examiner

METHOD AND TRANSMITTER FOR RESOURCE ALLOCATION IN CARRIER

TECHNICAL FIELD

The present invention generally relates to resource allocation in a carrier when several subcarrier spacings coexist in this carrier.

BACKGROUND ART

Some OFDM-based systems allow several parameters sets, sometimes referred to as "numerology", to coexist onto the same carrier. This is especially the case in the 5G systems such as the NR (New Radio) standard under definition in 3GPP. A numerology may include parameters such as the subcarrier spacing configuration, the size of the cyclic prefix, the number of symbols, etc. Thus on a carrier with a given bandwidth, different subcarrier spacing configurations can coexist, in a frequency domain multiplexing manner. This coexistence of different subcarrier spacing configurations causes difficulties in the resource allocation in such a carrier.

SUMMARY OF INVENTION

Indeed, if two or more subcarrier spacing configurations are defined in the same carrier and that resources are allocated in each subcarrier spacing configuration, loss of resources in the carrier may occur.

For example and like displayed in FIG. 2B, we consider three subcarrier spacing configurations defined by $f_0$, $f_1$ and $f_2$ with $f_0 < f_1 < f_2$ and an allocation of resource blocks (RBs) in each of these subcarrier spacing configurations, $RB_0$, $RB_1$, $RB_2$. These resource blocks are represented with dashed boxes each of them comprising 12 subcarriers of their own subcarrier spacing configuration $f_0$, $f_1$, $f_2$.

By RB we refer more generally to the smallest scheduling unit of the carrier, which in this example contains 12 subcarriers in the frequency domain across a fixed number of OFDM symbols in the time domain. In the time domain, the duration of the scheduling unit is thus different in different numerologies T0>T1>T2. Ti/Tj=$f_j$/$f_i$ for different numerologies.

For each numerology and more specifically for each subcarrier spacing configuration there is a raster in the frequency domain, in which the socket of the raster corresponds to the size of a resource block of the same numerology in the frequency domain.

The scheduling in such a carrier is done taking into account the raster of each numerology, indeed each resource block of a defined numerology fills a socket of the same numerology raster. When the resource blocks are aligned on their raster we refer to those resource blocks as nested.

Yet rasters of different numerologies have different granularities which in case of scheduling nested resource blocks of different numerologies can lead to loss of potential resource blocks in the carrier. Indeed, like shown in the FIG. 2B, between resource blocks from two different numerologies $f_0$, $f_1$, scheduled in the carrier, there may be an imposed gap in order to be able to align resource blocks from the numerology $f_1$ onto their own raster.

On the other hand the allocation of resource blocks of a low subcarrier spacing configuration can lead to the need of an important size of the control signaling overhead compared to the size of the control signaling overhead needed to allocate resource blocks with higher subcarrier spacing configuration.

Therefore there is a need for more flexibility in the way resource blocks are scheduled and allocated when several subcarrier spacing configurations coexist in the same carrier: either to have a better spectral efficiency or to have a smaller control signaling overhead.

The present invention aims to improve the situation.

To that end, the invention relates to a method implemented by computer means for a resource allocation in a carrier comprising several subcarriers, whereby the resource allocation is for allocating at least one resource of the carrier to at least one terminal, this method comprising:

a) defining for the carrier at least a first $f_j$ and a second $f_i$ different subcarrier spacing configurations, one of the subcarrier spacing configurations being a multiple of the other of the subcarrier spacing configurations, and defining the difference $\Delta_{ij}$ between the lowest frequency among the subcarriers that are allowable for subcarrier spacing $f_j$ and the lowest frequency among the subcarriers that are allowable for subcarrier spacing $f_i$, b) defining in the carrier at least one resource block $RB_j$ comprising N subcarriers of the first subcarrier spacing configuration $f_j$, said $RB_j$ having the subcarrier with the lowest frequency among the several subcarriers of the carrier that are allowable for subcarrier spacing $f_j$, and allocating in the carrier at least a number $L_i$ of resource blocks comprising N subcarriers of said second subcarrier spacing configuration $f_i$ to a given terminal.

More particularly, the allocation comprises:

determining the frequency $f_{jm}$ of the subcarrier having the lowest frequency that is allowable for for subcarrier spacing $f_j$ among the subcarriers of $RB_j$, and determining a frequency $f_{im\text{-}start}$ of the subcarrier having the lowest frequency among the subcarriers of the $L_i$ resource blocks allocated to the same terminal, this frequency $f_{im\text{-}start}$ satisfying to $f_{im\text{-}start} = f_{jm} + (kN)^* f_j + \Delta_{ij}$, with k a positive integer, and determining a frequency $f_{im\text{-}end}$ of the subcarrier having the highest frequency among the subcarriers of the $L_i$ resource blocks allocated to the same terminal, this frequency $f_{im\text{-}end}$ satisfying to $f_{im\text{-}end} = f_{im\text{-}start} + (L_i N - 1)^* f_i$.

In order to simplify the presentation and improve understanding thereafter $\Delta_{ij}$ will be set to 0, which means that the lowest frequency among the subcarriers that are allowable for subcarrier spacing $f_j$ and the lowest frequency among the subcarriers that are allowable for subcarrier spacing $f_i$ are the same. Moreover the sockets of the raster with the smaller subcarrier spacing configuration are perfectly included in the sockets of the raster with the bigger subcarrier spacing. Whereas if $\Delta_{ij}$ is not set to 0 the two rasters are slightly offset. Therefore by aligning a resource block onto the raster of another subcarrier spacing configuration the present invention encompasses also the cases where the resource block is offset by $\Delta_{ij}$ from the raster of this other subcarrier spacing configuration. Typically abs($\Delta_{ij}$)<max ($f_i$; $f_j$)

We refer to a subcarrier as allowable for subcarrier spacing f when the subcarrier can be contained in a resource block comprising N subcarriers of subcarrier spacing configuration f.

The present invention, within the resource allocation in a carrier where several subcarrier spacings coexist, enables allocating resource blocks of a subcarrier spacing configuration onto the raster of another subcarrier spacing configuration. More specifically the present invention matches the fact of allocating contiguous resource blocks to the same terminal with the fact of aligning the first resource block of such a group of resource blocks onto the raster of a different subcarrier spacing configuration. Such an allocation scheme which allocates a specific number $L_i$ of contiguous resource blocks to the same terminal, is done by specifying the position of the first resource block and the number $L_i$ of those resources blocks. We will refer hereinafter to such an allocation in an OFDM-based system as a resource allocation type 2.

Thus the invention enables to parameter the resource allocation so that allocation to a terminal of several contiguous resource blocks of a specific numerology is done by aligning the first resource block allocated onto a raster with a smaller subcarrier spacing configuration, enabling to avoid or at least to reduce the potential gap between said resource blocks allocated and resource blocks allocated with a different subcarrier spacing configuration and therefore to have a better spectral efficiency.

The invention also enables to parameter the resource allocation so that allocation to a terminal of several contiguous resource blocks of a specific numerology is done by aligning the first resource block allocated onto a raster with a wider subcarrier spacing configuration, enabling to reduce the control signaling overhead. Indeed for the first resource block the number of possible position on a raster with a coarser granularity is reduced compared to the number of possible position of this first resource block on its own raster or on a raster with a finer granularity. Therefore the resource allocation type 2 enables to allocate those several resource blocks to the terminal starting onto a raster with a wider subcarrier spacing configuration without losing the subsisting frequency resources in the raster's sockets in which at least one of those several resource block has been allocated, since there is no gap between each resource block allocated to the same terminal.

By resource blocks the present invention refers as well to virtual resource blocks or to physical resource blocks. Resource blocks also refer to any other resource allocation unit, such as resource block groups which encompass several resource blocks, or to a group of any pre-defined number of subcarriers.

According to an aspect of the invention, the $RB_j$ defined in the carrier has the subcarrier with the lowest frequency among the subcarriers that are allowable in the carrier for subcarrier spacing $f_j$.

Alternatively to the fact that the frequency $f_{jm}$ is the frequency of the subcarrier with the lowest frequency among the subcarriers of $RB_j$, the $f_{jm}$ can be the frequency of the first subcarrier that is allowable in the carrier. Alternatively the $f_{jm}$ can be the frequency of the subcarrier used as a reference subcarrier to allocate resources to a specific terminal.

For example the present invention refers to carrier band of a specific bandwidth but the invention can also be implemented on a pre-defined portion of the entire carrier band, more specifically the pre-defined portion seen by a terminal as the maximum band where its own resource allocation and/or control signaling can occur.

According to an aspect of the invention, the number $L_i$, satisfies to:

$q_i L_i + NRB_{start}^{(j)} \leq N_{RB}^{(j)}$ where:
$N_{RB}^{(j)}$ is a maximum number of resource blocks comprising N subcarriers of said first subcarrier spacing configuration $f_j$ that are allowable in said carrier during a time period of a resource block comprising N subcarriers of said first subcarrier spacing configuration $f_j$, $NRB_{start}^{(j)}$ is a maximum number of resource blocks comprising N subcarriers of said first subcarrier spacing configuration $f_j$ having a subcarrier with a lower frequency than said frequency $f_{im-start}$ that are allowable in said carrier during a time period of a resource block comprising N subcarriers of said first subcarrier spacing configuration $f_j$, that is $(f_{im-start} - f_{jm} - \Delta_{ij})/(N*f_j)$, $q_i$ is defined by $f_i = q_i f_j$.

According to an aspect of the invention, the allocation of resource blocks allocated to the same terminal and comprising N subcarriers of the same subcarrier spacing configuration $f_i$ is defined by a resource indication value RIV, and the RIV value is an integer and is a function of $L_i$ and $NRB_{start}^{(j)}$. Since the allocation of contiguous resource blocks of a certain subcarrier spacing configuration $f_i$ aligned on the raster of a subcarrier spacing configuration $f_j$, is fully determined by $L_i$ and $NRB_{start}^{(j)}$, this enables to link for each resource allocation of contiguous resource blocks allocated to the same terminal a RIV value.

According to an aspect of the invention, the RIV function is an injective function of any couple comprising $L_i$ and $NRB_{start}^{(j)}$ values. This enables the terminal which receives a RIV value according to the resources that have been allocated to it to decode the couple $NRB_{start}^{(j)}$ and the $L_i$ of this resource allocation.

According to an aspect of the invention, the RIV is a surjective function among the integers from 0 to the maximum value taken by RIV. This ensure that the maximum value taken by RIV when going through the different possible resource allocation, that is the different pairs of $L_i$ and $NRB_{start}^{(j)}$ values with $q_i L_i + NRB_{start}^{(j)} \leq N_{RB}^{(j)}$, is the lowest possible. This enables to have the optimum number of bits necessary for signaling all the possible resource allocations of contiguous resource blocks of a certain subcarrier spacing configuration $f_i$ aligned on the raster of a subcarrier spacing configuration $f_j$.

According to an aspect of the invention, the $f_i$ is a multiple $q_i$ of said $f_j$. The resource allocation of several contiguous resource blocks of the subcarrier spacing configuration $f_i$ to a terminal is done by aligning the first resource block allocated onto a raster with a smaller subcarrier spacing configuration $f_j$. This enables to avoid or at least to reduce the gap between said allocated resource blocks and allocated resource blocks with lower subcarriers frequencies and therefore to have a better spectral efficiency. In addition by having $f_i$ being a multiple $q_i$ of said $f_j$ it enables to allocate resource blocks with higher subcarriers frequencies from said allocated resource blocks on the same raster with no gap with said allocated resource blocks.

According to an aspect of the invention, the relative integer k is not a multiple of $q_i$.

According to an aspect of the invention, the RIV is defined by:

$$\begin{cases} RIV = (L_i - 1) + p_i * NRB_{start}^{(j)} & \text{if } NRB_{start}^{(j)} \leq r_i + 1 + \left\lceil \frac{1}{2} * q_i * (p_i - 1) \right\rceil \\ RIV = p_i * (r_i + 1 + N_{RB}^{(j)} - q_i - NRB_{start}^{(j)}) + p_i - L_i & \text{otherwise} \end{cases}$$

Where:
  $r_i$ is a remainder of the division of $N_{RB}^{(j)}$ by $q_i$ $$p_i = \left\lfloor \frac{N_{RB}^{(j)}}{q_i} \right\rfloor$$

This enables the transmitter to code a RIV value for each allocation of contiguous resource blocks allocated, this coding being of low complexity.

In addition this enables the terminal which receives a RIV value according to the resources that have been allocated to it to decode the couple $NRB_{start}^{(j)}$ and the $L_i$ of this resource allocation, this decoding is of low complexity.

Indeed the terminal obtains data related to the subcarrier spacing configuration (for example: $f_i$ and $f_j$, $f_i$ and $q_i$ or $f_j$ and $q_j$), of the resource blocks that are allocated to it and of the carrier band with respect to another numerology $N_{RB}^{(j)}$. When the terminal further receives the RIV value, the terminal can then decode the couple $NRB_{start}^{(j)}$ and the $L_i$ as follows:

based on $N_{RB}^{(j)}$ and $q_i$, the terminal computes:

$$p_i = \left\lfloor \frac{N_{RB}^{(j)}}{q_i} \right\rfloor,$$

with $\lfloor x \rfloor$ being the floor function and $\lceil x \rceil$ being the ceiling function; and
  $r_i$=rem $(N_{RB}^{(j)}, q_i)$, with rem(Y;X) being the remainder of the division of Y by X.
  based on reception of its RIV value the terminal computes:

$$P = \left\lfloor \frac{RIV}{p_i} \right\rfloor; \text{ and}$$

$$R = \text{rem }(RIV, p_i); \text{ and}$$

$$NRB_{start}^{(j)} = \begin{cases} P & \text{if } P + q_i * (R+1) \leq N_{RB}^{(j)} \\ N_{RB}^{(j)} - q_i + r_i + 1 - P & \text{otherwise} \end{cases}$$

$$L_i = \begin{cases} R+1 & \text{if } P + q_i * (R+1) \leq N_{RB}^{(j)} \\ p_i + R & \text{otherwise} \end{cases}$$

According to an aspect of the invention, the RIV is defined by:

$$\begin{cases} RIV = (L_i - 1)\left(r_i + 1 + \left\lceil (p_i - 1) * \frac{q_i}{2} \right\rceil + 1\right) + NRB_{start}^{(j)} \\ \quad \text{if } NRB_{start}^{(j)} \leq r_i + 1 + \left\lceil (p_i - 1) * \frac{q_i}{2} \right\rceil \\ RIV = (p_i - L_i) * \left(r_i + 1 + \left\lceil (p_i - 1) * \frac{q_i}{2} \right\rceil + 1\right) + \\ \quad \left(r_i + 1 + N_{RB}^{(j)} - q_i - NRB_{start}^{(j)}\right) \text{ otherwise} \end{cases}$$

Where:
  $r_i$ is a remainder of the division of $N_{RB}^{(j)}$ by $q_i$ $$p_i = \left\lfloor \frac{N_{RB}^{(j)}}{q_i} \right\rfloor$$

This enables the transmitter to code a RIV value for each allocation of contiguous resource blocks allocated, this coding being of low complexity.

In addition this enables the terminal which receives a RIV value according to the resources that has been allocated to it to decode the couple $NRB_{start}^{(j)}$ and the $L_i$ of this resource allocation, this decoding is of low complexity.

Indeed the terminal obtains data related to the subcarrier spacing configuration (for example: $f_i$ and $f_j$, $f_i$ and $q_i$ or $f_j$ and $q_j$), of the resource blocks that are allocated to it and of the carrier band with respect to another numerology $N_{RB}^{(j)}$. When the terminal further receives the RIV value, the terminal can then decode the couple $NRB_{start}^{(j)}$ and the $L_i$ as follows:

based on $N_{RB}^{(j)}$ and $q_i$, the terminal computes:

$$p_i = \left\lfloor \frac{N_{RB}^{(j)}}{q_i} \right\rfloor;$$

and
  $r_i$=rem $(N_{RB}^{(j)}, q_i)$, rem (Y;X) being the remainder of the division of Y by X; and $$N = r_i + 1 + \left\lceil (p_i - 1) * \frac{q_i}{2} \right\rceil.$$

based on reception of its RIV value the terminal computes:

$$P = \left\lfloor \frac{RIV}{N+1} \right\rfloor; \text{ and}$$

$$R = \text{rem }(RIV, N+1); \text{ and}$$

$$NRB_{start}^{(j)} = \begin{cases} R & \text{if } R + q_i * (P+1) \leq N_{RB}^{(j)} \\ N_{RB}^{(j)} - q_i + r_i + 1 - R & \text{otherwise} \end{cases}$$

$$L_i = \begin{cases} P+1 & \text{if } R + q_i * (P+1) \leq N_{RB}^{(j)} \\ p_i - P & \text{otherwise} \end{cases}$$

According to an aspect of the invention, the RIV is defined by:

$$\begin{cases} RIV = (L_i - 1)\left(N_{RB}^{(j)} - q_i + r_i + 2\right) + NRB_{start}^{(j)} \\ \quad \text{if } L_i \leq \left\lceil \frac{p_i}{2} \right\rceil \\ RIV = (p_i - L_i) * \left(N_{RB}^{(j)} - q_i + r_i + 2\right) + \\ \quad \left(N_{RB}^{(j)} - q_i - r_i + 1 - NRB_{start}^{(j)}\right) \text{ otherwise} \end{cases}$$

Where:
  $r_i$ is a remainder of the division of $N_{RB}^{(j)}$ by $q_i$ $$p_i = \left\lfloor \frac{N_{RB}^{(j)}}{q_i} \right\rfloor$$

This enables the transmitter to code a RIV value for each allocation of contiguous resource blocks allocated, this coding being of low complexity.

In addition this enables the terminal which receives a RIV value according to the resources that has been allocated to it to decode the couple $NRB_{start}^{(j)}$ and the $L_i$ of this resource allocation, this decoding is of low complexity.

Indeed the terminal obtains data related to the subcarrier spacing configuration (for example: $f_i$ and $f_j$, $f_i$ and $q_i$ or $f_j$ and $q_i$), of the resource blocks that are allocated to it and of the carrier band with respect to another numerology $N_{RB}^{(j)}$. When the terminal further receives the RIV value, the terminal can then decode the couple $NRB_{start}^{(j)}$ start and the $L_i$ as follows:

based on $N_{RB}^{(j)}$ and $q_i$, the terminal computes:

$$p_i = \left\lfloor \frac{N_{RB}^{(j)}}{q_i} \right\rfloor;$$

and $r_i$=rem $(N_{RB}^{(j)}, q_i)$ rem $(Y;X)$ being the remainder of the division of $Y$ by $X$.

based on reception of its RIV value the terminal computes:

$$P = \left\lfloor \frac{RIV}{N_{RB}^{(j)} - q_i + r + 2} \right\rfloor; \text{ and}$$

$R = \text{rem}\left(RIV, N_{RB}^{(j)} - q_i + r + 2\right)$; and $$NRB_{start}^{(j)} = \begin{cases} R & \text{if } R + q_i*(P+1) \leq N_{RB}^{(j)} \\ N_{RB}^{(j)} - q_i + r_i + 1 - R & \text{otherwise} \end{cases}$$

$$L_i = \begin{cases} P+1 & \text{if } R + q_i*(P+1) \leq N_{RB}^{(j)} \\ p_i - P & \text{otherwise} \end{cases}$$

According to an aspect of the invention, the RIV is defined by:

$$RIV = \left(\sum_{l=1}^{L-1} S_l^{(j)}\right) + NRB_{start}^{(j)} = (L_i - 1)*(N_{RB}^{(j)} + 1) - \frac{q_i * L_i * (L_i - 1)}{2} + NRB_{start}^{(j)}$$

Where:

$S_l^{(j)} = N_{RB}^{(j)} - q_i * l + 1$

This enables the transmitter to code a RIV value for each allocation of contiguous resource blocks allocated, this coding being of lower complexity than the coding of the RIVs previously defined, but in return the decoding of the couple $NRB_{start}^{(j)}$ and the $L_i$ by the terminal which receives the RIV value is more complex than the decoding of the previous RIV.

Indeed the terminal obtains data related to the subcarrier spacing configuration (for example: $f_i$ and $f_j$, $f_i$ and $q_i$ or $f_j$ and $q_i$), of the resource blocks that are allocated to it and of the carrier band with respect to another numerology $N_{RB}^{(j)}$. When the terminal further receives the RIV value, the terminal can then decode the couple $NRB_{start}^{(j)}$ and the $L_i$ as follows:

based on $N_{RB}^{(j)}$, $q_i$ and the RIV value the terminal received, the terminal calculates the value M such as:

$$\sum_{l=1}^{M-1} S_l^{(j)} \leq RIV < \sum_{l=1}^{M} S_l^{(j)}$$

then the terminal calculates $NRB_{start}^{(j)}$ and $L_i$ as follows:

$$\begin{cases} NRB_{start}^{(j)} = RIV - \sum_{l=1}^{M-1} S_l^{(j)} \\ L_i = M \end{cases}$$

Like previously mentioned the decoding of this RIV is more complex since each time the terminal decodes the RIV it needs to calculate the sums $\Sigma_{l=1}^{M-1} S_l^{(j)}$ or at least load it from a lookup table which requires more calculating resource to decode and/or more memory storage than the previous RIV.

According to an aspect of the invention, the carrier, the resource allocation and the terminal are defined according to a wireless communication protocol using OFDM multiplexing or one of its variants.

According to an aspect of the invention, the carrier, the resource allocation and the terminal are defined according to a wireless communication protocol being a 5G protocol.

According to an aspect of the invention, the carrier, the resource allocation and the terminal are defined according to a wireless communication protocol being a New Radio standard according to 3GPP standard.

A second aspect of the invention concerns a transmitter configured for resource allocation in a carrier comprising several subcarriers, whereby the resource allocation is for allocating at least one resource of said carrier to at least one terminal, said transmitter being configured to perform:

a) defining for the carrier at least a first $f_j$ and a second $f_i$ different subcarrier spacing configurations, one of the subcarrier spacing configurations being a multiple of the other one of these subcarrier spacing configurations, and defining the difference $\Delta_{ij}$ between the lowest frequency among the subcarriers that are allowable for subcarrier spacing $f_j$ and the lowest frequency among the subcarriers that are allowable for subcarrier spacing $f_i$, b) defining in the carrier at least one resource block $RB_j$ comprising N subcarriers of the first subcarrier spacing configuration $f_j$, said $RB_j$ having the subcarrier with the lowest frequency among said several subcarriers of the carrier that are allowable for subcarrier spacing $f_j$, and allocating in the carrier at least a number $L_i$ of resource blocks comprising N subcarriers of the second subcarrier spacing configuration $f_i$ to a given terminal.

More particularly, for the allocating of said resource blocks to the given terminal, the transmitter is further configured for:

determining the frequency $f_{jm}$ of the subcarrier having the lowest frequency that are allowable for subcarrier spacing $f_j$ among the subcarriers of $RB_j$, and determining a frequency $f_{im-start}$ of the subcarrier having the lowest frequency among the subcarriers of the $L_i$ resource blocks allocated to the same terminal, said frequency $f_{im-start}$ satisfying to $f_{im-start} = f_{jm} + (kN)*f_j + \Delta_{ij}$, with k a positive integer, and determining a frequency $f_{im-end}$ of the subcarrier having the highest frequency among the subcarriers of the $L_i$ resource blocks allocated to the same terminal, said frequency $f_{im-end}$ satisfying to $f_{im-end}=f_{im-start}+(L_iN-1)*f_i$.

According to an aspect of the invention, the transmitter comprises a memory unit which has in its memory for each couple of possible values of a number $NRB_{start}^{(j)}$ and $L_i$ a unique resource indication value RIV, $NRB_{start}^{(j)}$ being a maximum number of resource blocks comprising N subcarriers of the first subcarrier spacing configuration $f_j$, having a subcarrier with a lower frequency than said frequency $f_{im-start}$ that are allowable in the carrier during a time period of a resource block comprising N subcarriers of the first subcarrier spacing configuration $f_j$.

More particularly, the transmitter is further configured to:
provide the RIV when the allocation of resource blocks to the same terminal defined by the couple of $L_i$ and $NRB_{start}^{(j)}$ is performed, and
transmit the RIV to said given terminal.

For example the processor of the transmitter can enter the values of a number $NRB_{start}^{(j)}$ and $L_i$ in a lookup table corresponding to the subcarrier spacing configuration of the resource blocks that are allocated and to the carrier band with respect to another numerology $N_{RB}^{(j)}$, which provides in return the corresponding RIV value.

According to an alternative of the aspect of the invention where the memory unit has in its memory for each couple of possible values of a number $NRB_{start}^{(j)}$ and $L_i$ a unique resource indication value RIV, the processor can calculate the RIV by applying the formulas mentioned above.

A third aspect of the invention concerns a terminal configured to use a carrier according to a resource allocation being performed in the carrier, this resource allocation having been carried out according to the invention as described previously. The terminal, being configured to use at least a number $L_i$ of resource blocks comprising N subcarriers of said second subcarrier spacing configuration $f_i$, comprises:
a communication module configured to receive an allocation resource block information through a control channel, indicating an allocation of at least a number $L_i$ of resource blocks allocated to the terminal and comprising N subcarriers of the second subcarrier spacing configuration $f_i$,
a processing module which is configured to determine the resource blocks that are allocated to the terminal according to the allocation resource block information, more particularly the processing module is configured to determine the resource block allocated to the terminal:
as having the frequency $f_{im-start}$ of the subcarrier having the lowest frequency among the subcarriers of said $L_i$ resource blocks allocated to the same terminal, said frequency $f_{im-start}$ satisfying to $f_{im-start}=f_{jm}+(kN)*f_j+\Delta_{ij}$, with k a positive integer, and
as having the frequency $f_{im-end}$ of the subcarrier having the highest frequency among the subcarriers of said $L_i$ resource blocks allocated to the same terminal, said frequency $f_{im-end}$ satisfying to $f_{im-end}=f_{im-start}+(L_iN-1)*f_i$.

According to an alternative the terminal further comprises a memory unit storing for each couple of possible values of a number $NRB_{start}^{(j)}$ and said $L_i$ a unique resource indication value RIV, $NRB_{start}^{(j)}$ start being a maximum number of resource blocks comprising N subcarriers of the first subcarrier spacing configuration $f_j$ having a subcarrier with a lower frequency than said frequency $f_{im-start}$ that are allowable in said carrier during a time period of a resource block comprising N subcarriers of said first subcarrier spacing configuration $f_j$, and more particularly the processing module is configured to read said memory unit and determine the couple values $L_i$ and $NRB_{start}^{(j)}$ upon reception of an RIV value in said allocation resource block information.

For example the processing module of the terminal enters the RIV value that he received in a lookup table corresponding to the subcarrier spacing configuration of the resource blocks that are allocated to it, and to the carrier band with respect to another numerology $N_{RB}^{(j)}$, which provides in return the corresponding couple of a number $NRB_{start}^{(j)}$ and $L_i$ values.

According to the present invention the terminal encompasses all types of terminals, for instance mobile phones, vehicle communication systems and all kinds of connected devices and more generally all end systems.

According to an alternative of the aspect of the invention where the memory unit has in its memory for each couple of possible values of a number $NRB_{start}^{(j)}$ and $L_i$ a unique resource indication value RIV, the processing module can calculate the couple of a number $NRB_{start}^{(j)}$ and $L_i$ values by applying the calculating steps mentioned above which enables to calculate a number $NRB_{start}^{(j)}$ and a number $L_i$ corresponding to a specific RIV.

For example the terminal receives the RIV and based on the knowledge of $N_{RB}^{(j)}$ and $q_i$ and on the RIV value the terminal received, the processing module calculates the value M such as:

$$\sum_{l=1}^{M-1} S_l^{(j)} \leq RIV < \sum_{l=1}^{M} S_l^{(j)}$$

Then the processing module calculates $NRB_{start}^{(j)}$ and $L_i$ as follows:

$$\begin{cases} NRB_{start}^{(j)} = RIV - \sum_{l=1}^{M-1} S_l^{(j)} \\ L_i = M \end{cases}$$

A fourth aspect of the invention concerns a computer program product comprising code instructions to perform the method as describe previously when said instructions are run by a processor.

The present invention is illustrated by way of example, and not by way of limitation, in the figures of the accompanying drawings, in which like reference numerals refer to similar elements and in which:

DESCRIPTION OF EMBODIMENTS

Figure 1:
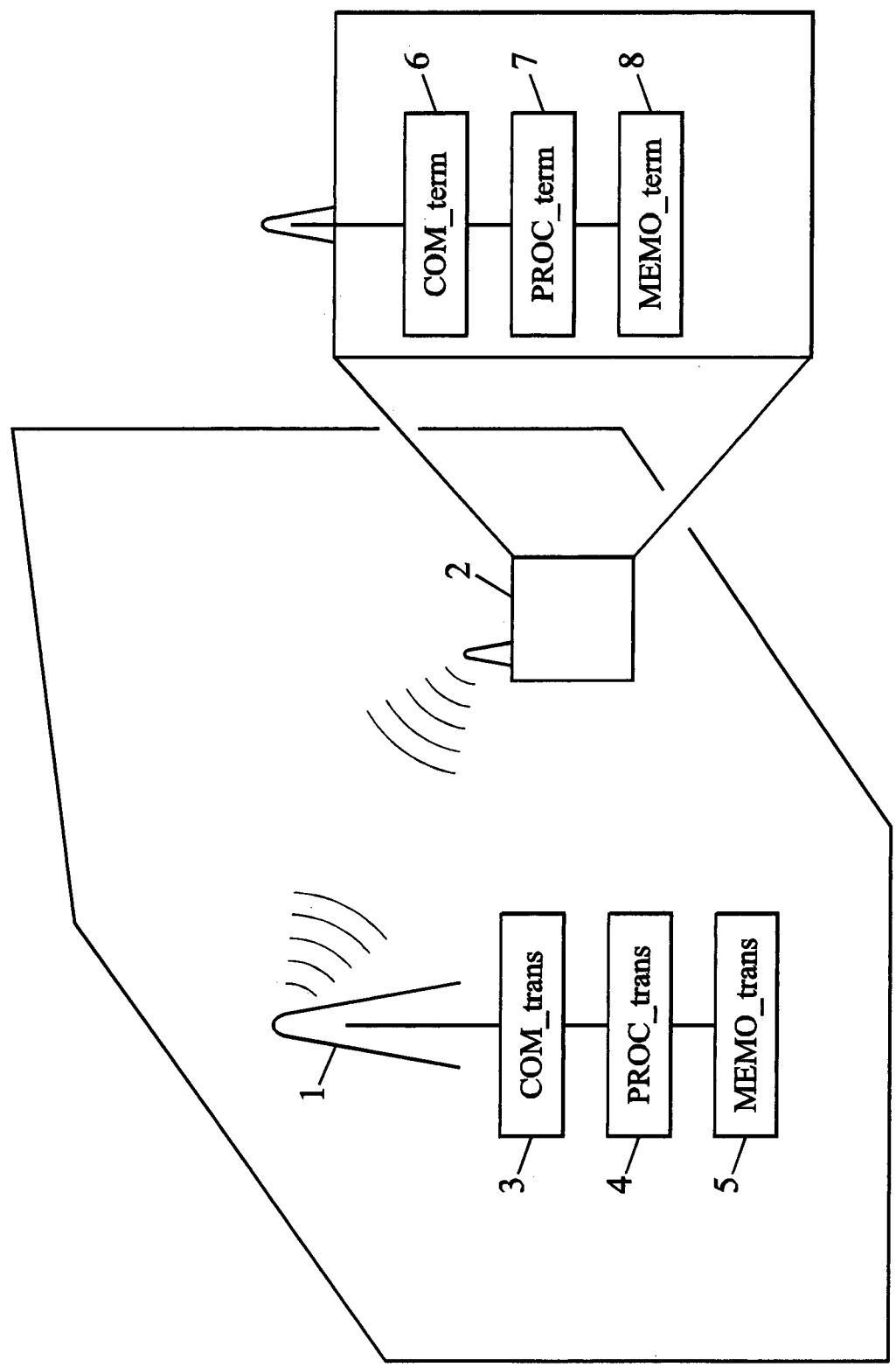
FIG. 1 illustrates a transmitter and a terminal to which resources are allocated.

Referring to FIG. 1, there is shown a transmitter 1, for example in the OFDM-based 5G system like NR, a base station BS and a terminal in the cell of the transmitter. The terminal 2, for example in the OFDM-based 5G system like NR a user equipment UE, is allocated resources by the base station.

The transmitter 1 comprises one communication module (COM_trans) 3, one processing module (PROC_trans) 4 and a memory unit (MEMO_trans) 5. The MEMO_trans 5 comprises a non-volatile unit which retrieves the computer program and a volatile unit which retrieves the allocation parameters. The PROC_trans which is configured to determine the allocation resource block information, such as a RIV value, according to the resource blocks that are allocated to the terminal. The COM_trans is configured to transmit to the terminal the resource block information.

The terminal comprises one communication module (COM_term) 6, one processing module (PROC_term) 7 and a memory unit (MEMO_term) 8. The MEMO_term 8 comprises a non-volatile unit which retrieves the computer program and a volatile unit which retrieves the parameters of the carrier and the allocation resource block information. The PROC_term 7 which is configured to determine the resource blocks that are allocated to said terminal according to the allocation resource block information. The COM_term 6 is configured to receive from the transmitter an allocation resource block information.

In the following, only part of the carrier band or part of a pre-defined portion of the carrier band is represented.

Figure 2A:
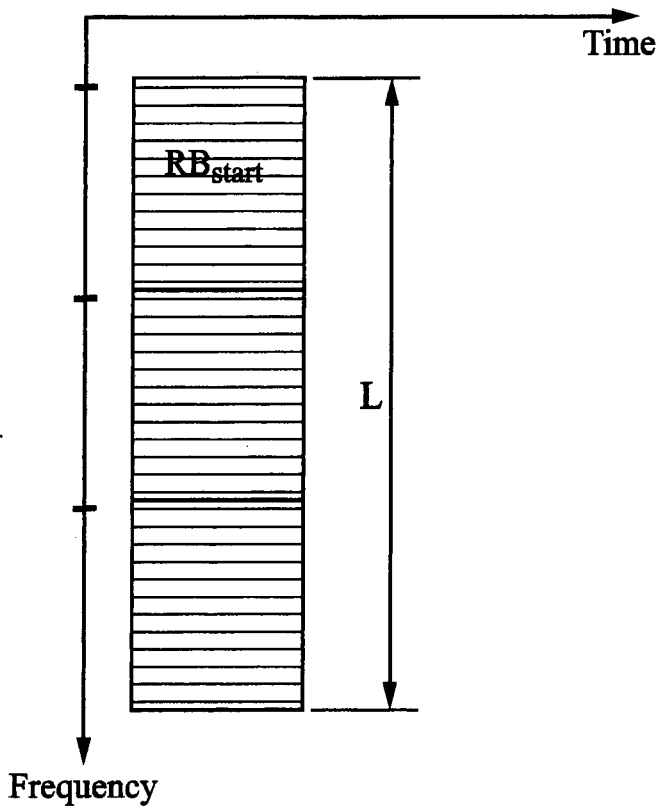
FIG. 2A schematizes a usual resource block scheduling in a carrier where only one numerology is defined.

Referring to FIG. 2A, there is shown part of a carrier where only one numerology is defined and where resource blocks from this numerology are scheduled. For example in LTE/LTE-Advanced a carrier has generally a bandwidth which is a multiple of 20 MHz. Around 90% of this bandwidth is effectively used for the communication needs. In the frequency domain, groups of subcarriers are allocated to a terminal in the resource allocation process. In the LTE/LTE-Advanced subcarriers are grouped into resource blocks (RB) of 12 subcarriers each. The resource block defines the resource allocation granularity, in the sense where a user is allocated a certain number of resource blocks, and therefore a certain bandwidth. In the LTE/LTE-Advanced the subcarrier spacing, that is the frequency spacing between two adjacent subcarrier, is fixed to 15 kHz. Therefore the frequency bandwidth of a resource block is fixed and the possible number of resource blocks in a carrier is only dependent on the carrier bandwidth.

To a numerology and more specifically to a subcarrier spacing configuration and to a TTI configuration/number of OFDM symbols corresponds a raster, in which the socket of the raster corresponds to the size of a resource block of the same numerology in the frequency domain. All the resource blocks are scheduled aligned on this raster. Each potential resource block nested on the raster is indexed to an integer number. For example in the logical region virtual resource blocks are numbered to 1 to M, M being the maximum number of resource blocks that are allowable in the carrier. The virtual resource block number 1 is the first resource block in the logical region and the $M^{th}$ resource block is the last resource block of the carrier. Several scheme of allocation exist, for example in LTE/LTE-A resource allocation type 2 is a compact format indicating to a terminal a set of contiguously virtual resource blocks which is allocated to it for downlink or uplink transfer. Therefore a resource indication value (RIV) corresponding to the first resource block $RB_{start}$ allocated to the terminal and a length L in terms of virtually contiguously allocated resource blocks, is sent to the terminal. The RIV may be defined by:

$RIV=M(L-1)+NRB_{start}$ if $(L-1) \leq \lfloor N/2 \rfloor$ $RIV=M(M-L+1)+(M-1-NRB_{start})$ otherwise where $NRB_{start}$ is the number corresponding to the position of $RB_{start}$.

The RIV value enables the terminal to decode the position of the first virtual resource block $RB_{start}$ which is allocated to it and the number of virtually contiguous resource blocks that are allocated to the terminal. Once $RB_{start}$ and L are decoded the terminal is able to define the resource blocks that where allocated to it.

Figure 2B:
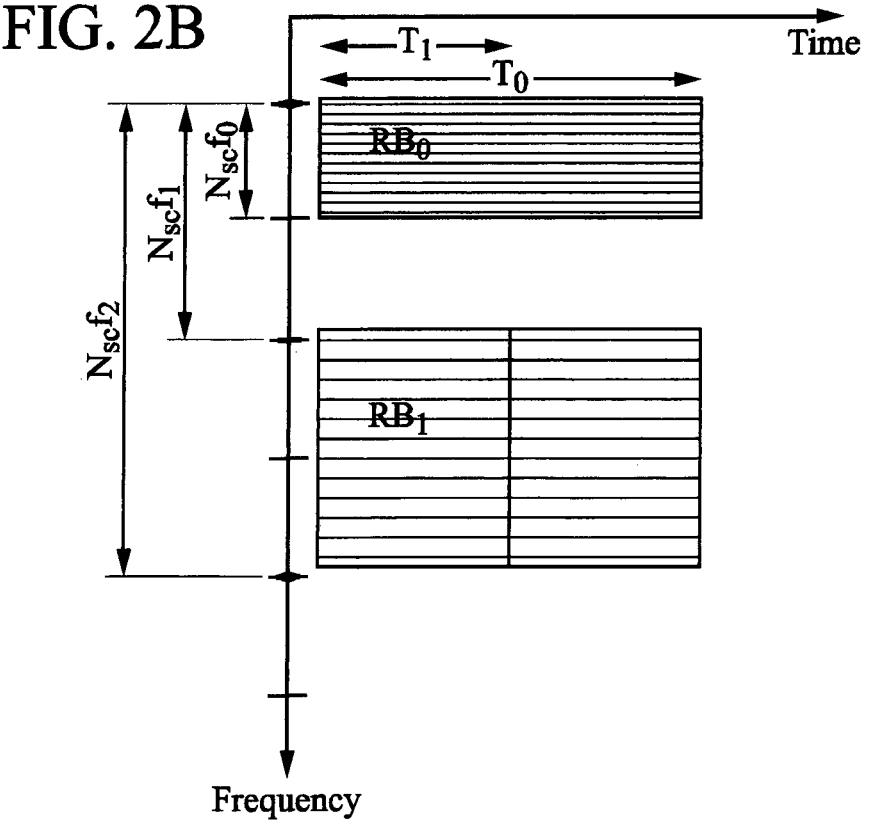
FIG. 2B schematizes a usual resource block scheduling in a carrier where several subcarrier spacing configurations coexists usually.

Referring to FIG. 2B, there is shown part of a carrier where several subcarrier spacing configurations coexists and where resource blocks from two of these different numerologies are scheduled. This is notably possible in a OFDM-based 5G system like NR (New Radio) standard. For example in the FIG. 2B, three subcarrier spacing configurations coexists which are $f_0$, $f_1$ and $f_2$. BW is the effectively occupied bandwidth of the carrier. The maximum number of resource blocks of a specific numerology that are allowable in the carrier is $$N_{RB}^{(i)} = \left\lfloor \frac{BW}{f_i} \right\rfloor.$$

It should be noted that for certain values of $f_i$, one extra RB can exist if fractional RBs containing less than N subcarriers are allowed for example at band edge. For the numerical example $\{f_0, f_1, f_2\}=\{15$ kHz, 30 kHz, 120 kHz$\}$ and with 12 carrier per resource block. The boxes represent resource blocks containing 12 subcarriers in the frequency domain across a fixed number of OFDM symbols in the time domain (e.g. 7 OFDM symbols). In the time domain, the duration of the scheduling unit is thus different in different numerologies T0>T1>T2 (in the example, $T_2=T_1/2=T_0/4$ when $f_2=2f_1=4f_0$). Ti/Tj=$f_j/f_i$ for different numerologies. FIG. 2B shows two resource blocks with different subcarrier spacing configurations scheduled. The top resource block $RB_0$ has a subcarrier spacing configuration of $f_0$ and duration of $T_0$, and under it one resource block $RB_1$ with a subcarrier spacing configuration of $f_1$ and duration of $T_1$. In this example we will assume that $RB_0$ is the first virtual resource block in the logical band. Each of these resource blocks are nested on its own raster, so in this case $RB_1$ cannot be contiguous to $RB_0$. Therefore there is an imposed gap in order to be able to align $RB_1$ on its raster, leading to loss of resources in the carrier. In the example in FIG. 2B we considered $\Delta_{ij}=0, \forall i,j \in \{0,1,2\}$.

Figure 2C:
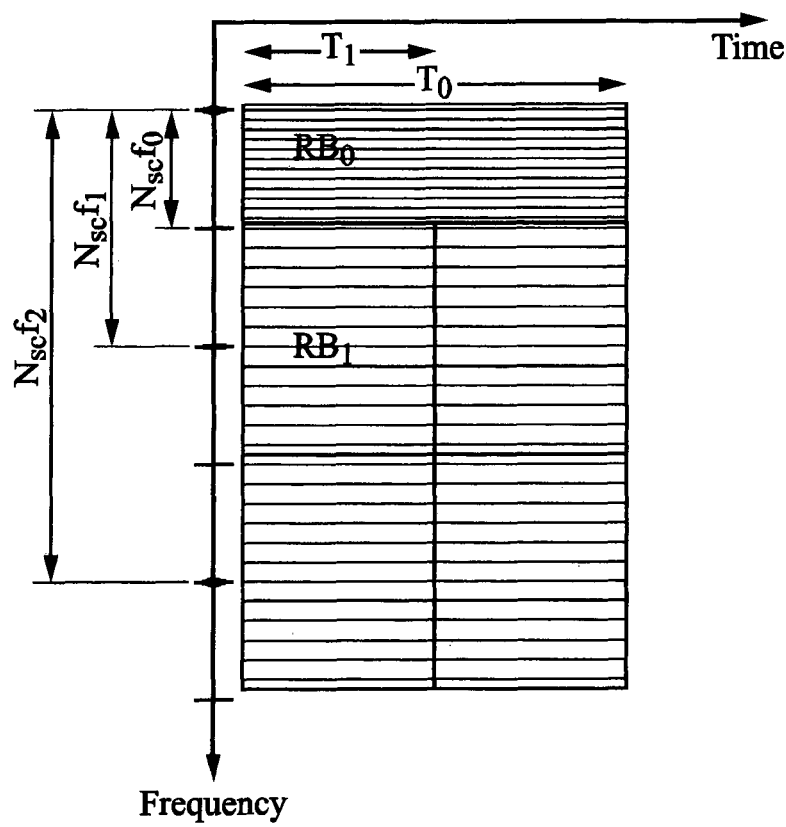
FIG. 2C schematizes resource block scheduling according to the invention in a carrier where several subcarrier spacing configurations coexists.

Referring to FIG. 2C, as in the example of FIG. 2B there is shown part of a carrier where several subcarrier spacing configurations coexists and where resource blocks from two of these different numerologies are scheduled. More specifically, three subcarrier spacing configurations coexists which are $f_0$, $f_1$ and $f_2$ with $f_2=2f_1=4f_0$. As in FIG. 2B, two resource blocks with different subcarrier spacing configurations are scheduled in the carrier. In contrary to FIG. 2B, $RB_1$ is not nested on its raster indeed according to the invention, $RB_1$ is aligned on a different raster, in this case the raster of $RB_0$. Since the raster of $RB_0$ is finer than the one of $RB_1$, $RB_1$ can be more freely placed and thus avoid the gap between $RB_0$ and $RB_1$.

Therefore the transmitter allocates to a terminal a set of L contiguous resource blocks, the first resource block allocated being $RB_{start}^{(1)}$. Therefore a specific RIV is defined corresponding to the allocation of L contiguous resource blocks of subcarrier spacing configuration $f_1$ starting on the raster of the subcarrier spacing configuration $f_0$ allocated by the transmitter to the terminal.

For example $$\begin{cases} RIV = (L-1) + p_1 * NRB_{start}^{(0)} & \text{if } NRB_{start}^{(0)} \leq r_1 + 1 + \lceil p_1 - 1 \rceil \\ RIV = \left\lfloor \dfrac{N_{RB}^{(0)}}{2} \right\rfloor * (r_1 + N_{RB}^{(0)} - 1 - \\ \qquad NRB_{start}^{(0)}) + p_1 - L & \text{otherwise} \end{cases}$$

Where $r_1$ is the remainder of the division of $N_{RB}^{(0)}$ by 2 and $NRB_{start}^{(0)}$ is the number corresponding to the position of $RB_{start}^{(1)}$.

Figure 3A:
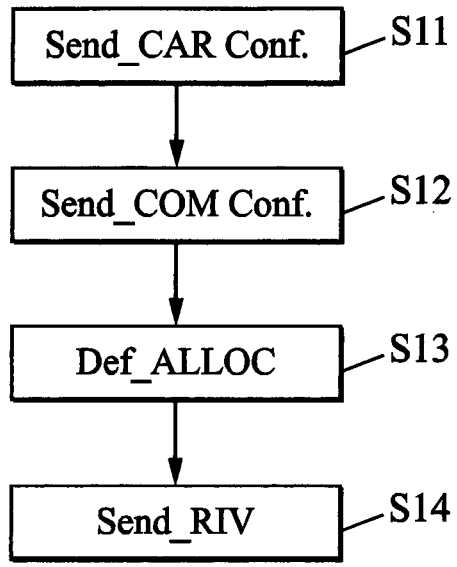
FIG. 3A illustrates a flowchart representing the steps to transmit allocation resource block information.

Referring to FIG. 3A there is shown a flowchart representing the steps according to an aspect of the invention, to allocate resource blocks in the carrier by the transmitter to a terminal.

At step 11 (S11) the transmitter sends to the terminal parameters concerning the cell settings including the carrier bandwidth BW and information on supported numerologies and/or raster alignment if needed (e.g. $\Delta_{ij}$). More specifically the transmitter sends to the terminal information allowing the terminal to know directly or deduce at least the following parameters: $f_0$, $f_1$, $N_{RB}^{(0)}$.

At step 12 (S12) the transmitter sends to the terminal the allocation parameters, for example indications allowing the terminal to deduce which type of resource blocks (subcarrier spacing configuration of the resource blocks) will be allocated to the terminal and therefore which set of formulae or lookup table will be necessary to decode the RIV value, if several sets are possible.

At step 13 (S13) the transmitter defines the contiguous resource blocks it allocates to the terminal.

At step 14 (S14) the transmitter sends the RIV value through a control channel The RIV value is calculated with the RIV formula mentioned above based on the contiguous resource blocks the transmitter allocates to the terminal.

Figure 3B:
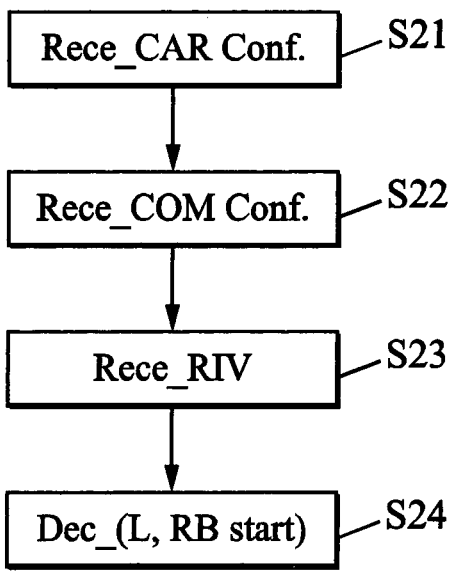
FIG. 3B illustrates a flowchart representing the steps of receiving by the terminal the allocation resource block information and decoding this information to define the resource blocks allocated to the terminal.

Referring to FIG. 3B there is shown a flowchart representing the steps according to an aspect of the invention, to define by the terminal the resource blocks that are allocated to it.

At step 21 (S21) the terminal receives from the transmitter the parameters concerning the cell settings including the carrier bandwidth BW and information on supported numerologies and/or raster alignment if needed (e.g. $\Delta_{ij}$). More specifically the terminal receives from the transmitter information allowing the terminal to know directly or deduce at least the following parameters: $f_0$, $f_1$, $N_{RB}^{(0)}$.

At step 22 (S22) the terminal receives from the transmitter the allocation parameters, for example indications allowing the terminal to deduce which type of resource blocks (subcarrier spacing configuration of the resource blocks) will be allocated to it and therefore which set of formula or lookup table will be necessary to decode the RIV value, if several sets are possible.

At step 23 (S23) the terminal receives from the transmitter through a control channel, the RIV value corresponding to the resource blocks allocated to the terminal.

At step 24 (S24) based on:
the knowledge of $N_{RB}^{(0)}$ and $q_1=2$, the terminal computes:
$r_1$ the remainder of the division of $N_{RB}^{(0)}$ by 2; and $$p_1 = \left\lfloor \dfrac{N_{RB}^{(0)}}{2} \right\rfloor;$$

and
the reception of its RIV value the terminal computes:

$$P = \left\lfloor \dfrac{RIV}{p_1} \right\rfloor; \text{ and}$$

$R = \text{rem}(RIV, p_1)$; and $$NRB_{start}^{(0)} = \begin{cases} P & \text{if } P + 2(R+1) \leq N_{RB}^{(0)} \\ N_{RB}^{(0)} - 1 + r_1 - P & \text{otherwise} \end{cases}$$

$$L = \begin{cases} R+1 & \text{if } P + q_i * (R+1) \leq N_{RB}^{(0)} \\ p_1 + R & \text{otherwise} \end{cases}$$

When L and $NRB_{start}^{(0)}$ are decoded the terminal has defined the resource blocks allocated to it.

Of course, the present invention is not limited to the examples of embodiments described in details above, but encompasses also further alternative embodiments.

For example the present invention refers to carrier band of a specific bandwidth but the invention can also be implemented on a pre-defined portion of the entire carrier band, more specifically the pre-defined portion seen by a terminal as the maximum band where its own resource allocation and control signaling can occur.

The invention claimed is:

1. A method implemented by computer for a resource allocation in a carrier comprising several subcarriers, whereby said resource allocation is for allocating at least one resource of said carrier to at least one terminal, said method comprising:
   a) defining for said carrier at least a first $f_j$ and a second $f_i$ different subcarrier spacing configurations, one of said subcarrier spacing configurations being a multiple of the other of said subcarrier spacing configurations, and defining the difference $\Delta_{ij}$ between the lowest frequency among the subcarriers that are allowable for subcarrier spacing $f_j$ and the lowest frequency among the subcarriers that are allowable for subcarrier spacing $f_i$,
   b) defining in said carrier at least one resource block $RB_j$ comprising N subcarriers of said first subcarrier spacing configuration $f_j$, said $RB_j$ having the subcarrier with the lowest frequency among said several subcarriers of the carrier that are allowable for subcarrier spacing $f_j$,
   c) allocating in said carrier at least a number $L_i$ of resource blocks comprising N subcarriers of said second subcarrier spacing configuration $f_i$ to a given terminal, where the allocation is performed by:
      determining the frequency $f_{jm}$ of the subcarrier having the lowest frequency that is allowable for subcarrier spacing $f_j$ among the subcarriers of $RB_j$, and
      determining a frequency $f_{im-start}$ of the subcarrier having the lowest frequency among the subcarriers of said $L_i$ resource blocks allocated to the same terminal, said frequency $f_{im\text{-}start}$ satisfying to $f_{im\text{-}start} = f_{jm} + (kN)*f_j + \Delta_{ij}$, with k a positive integer, determining a frequency $f_{im\text{-}end}$ of the subcarrier having the highest frequency among the subcarriers of said $L_i$ resource blocks allocated to the same terminal, said frequency $f_{im\text{-}end}$ satisfying to $f_{im\text{-}end} = f_{im\text{-}start} + (L_i N - 1)*f_i$, and d) transmitting a resource indication value RIV to the at least one terminal, said RIV being a function a specified position of a first resource block and the number Li of resource blocks.

2. The method according to claim 1, wherein said number $L_i$, satisfies to:

$$q_i L_i + NRB_{start}^{(j)} \leq N_{RB}^{(j)}$$

where:
$N_{RB}^{(j)}$ is a maximum number of resource blocks comprising N subcarriers of said first subcarrier spacing configuration $f_j$ that are allowable in said carrier during a time period of a resource block comprising N subcarriers of said first subcarrier spacing configuration $f_j$, $NRB_{start}^{(j)}$ is a maximum number of resource blocks comprising N subcarriers of said first subcarrier spacing configuration $f_j$ having a subcarrier with a lower frequency than said frequency $f_{im\text{-}start}$ that are allowable in said carrier during a time period of a resource block comprising N subcarriers of said first subcarrier spacing configuration $f_j$, $q_i$ is defined by $f_i = q_i f_j$, where $q_i$ or $1/q_i$ is an integer.

3. The method according to claim 2, wherein the allocation of resource blocks allocated to the same terminal and comprising N subcarriers of the same subcarrier spacing configuration $f_i$ is defined by the resource indication value RIV, and wherein said RIV value is an integer and is a function of $L_i$ and $NRB_{start}^{(j)}$.

4. The method according to claim 3, wherein said RIV function is an injective function of any couple comprising $L_i$ and $NRB_{start}^{(j)}$ values.

5. The method according to claim 3, wherein said RIV is a surjective function among the integers from 0 to a maximum value taken by RIV.

6. The method according to claim 3, wherein said $f_i$ being a multiple $q_i$ of said $f_j$.

7. The method according to claim 6, wherein said relative integer k is not a multiple of $q_i$.

8. The method according to claim 3, wherein said RIV is defined by:

$$\begin{cases} RIV = (L_i - 1) + p_i * NRB_{start}^{(j)} & \text{if } NRB_{start}^{(j)} \leq r_i + 1 + \left\lceil \frac{1}{2} * q_i * (p_i - 1) \right\rceil \\ RIV = p_i * \left(r_i + 1 + N_{RB}^{(j)} - q_i - NRB_{start}^{(j)}\right) + p_i - L_i & \text{otherwise} \end{cases}$$

Where:
$r_i$ is a remainder of the division of $N_{RB}^{(j)}$ by $q_i$ $$p_i = \left\lfloor \frac{N_{RB}^{(j)}}{q_i} \right\rfloor.$$

9. The method according to claim 3, wherein said RIV is defined by:

$$\begin{cases} RIV = (L_i - 1)\left(r_i + 1 + \left\lceil (p_i - 1) * \frac{q_i}{2} \right\rceil + 1\right) + NRB_{start}^{(j)} \\ \quad \text{if } NRB_{start}^{(j)} \leq r_i + 1 + \left\lceil (p_i - 1) * \frac{q_i}{2} \right\rceil \\ RIV = (p_i - L_i) * \left(r_i + 1 + \left\lceil (p_i - 1) * \frac{q_i}{2} \right\rceil + 1\right) + \\ \quad \left(r_i + 1 + N_{RB}^{(j)} - q_i - NRB_{start}^{(j)}\right) \text{ otherwise} \end{cases}$$

Where:
$r_i$ is a remainder of the division of $N_{RB}^{(j)}$ by $q_i$ $$p_i = \left\lfloor \frac{N_{RB}^{(j)}}{q_i} \right\rfloor.$$

10. The method according to claim 3, wherein said RIV is defined by:

$$\begin{cases} RIV = (L_i - 1)\left(N_{RB}^{(j)} - q_i + r_i + 2\right) + NRB_{start}^{(j)} & \text{if } L_i \leq \lceil p_i/2 \rceil \\ RIV = (p_i - L_i) * \left(N_{RB}^{(j)} - q_i + r_i + 2\right) + \\ \quad \left(N_{RB}^{(j)} - q_i + r_i + 1 - NRB_{start}^{(j)}\right) \text{ otherwise} \end{cases}$$

Where:
$r_i$ is a remainder of the division of $N_{RB}^{(j)}$ by $q_i$ $$p_i = \left\lfloor \frac{N_{RB}^{(j)}}{q_i} \right\rfloor.$$

11. The method according to claim 3, wherein said RIV is defined by:

$$RIV = \left(\sum_{l=1}^{L_i - 1} S_l^{(j)}\right) + NRB_{start}^{(j)} = (L_i - 1) * \left(N_{RB}^{(j)} + 1\right) - \frac{q_i * L_i * (L_i - 1)}{2} + NRB_{start}^{(j)}$$

Where:
$S_l^{(j)} = N_{RB}^{(j)} - q_i * l + 1.$

12. A transmitter comprising a processor for resource allocation in a carrier comprising several subcarriers, whereby said resource allocation is for allocating at least one resource of said carrier to at least one terminal, said transmitter being configured to perform:

a) defining for said carrier at least a first $f_j$ and a second $f_i$ different subcarrier spacing configurations, one of said subcarrier spacing configurations being a multiple of the other of said subcarrier spacing configurations, and defining the difference $\Delta_{ij}$ between the lowest frequency among the subcarriers that are allowable for subcarrier spacing $f_j$ and the lowest frequency among the subcarriers that are allowable for subcarrier spacing $f_i$, b) defining in said carrier at least one resource block $RB_j$ comprising N subcarriers of said first subcarrier spacing configuration $f_j$, said $RB_j$ having the subcarrier with the lowest frequency among said several subcarriers of the carrier that are allowable for subcarrier spacing $f_j$, and c) allocating in said carrier at least a number $L_i$ of resource blocks comprising N subcarriers of said second subcarrier spacing configuration $f_i$ to a given terminal, where, for the allocating of said resource blocks to the given terminal, the transmitter is further configured to:

determine the frequency $f_{jm}$, of the subcarrier having the lowest frequency that is allowable for subcarrier spacing $f_j$ among the subcarriers of $RB_j$, and determine a frequency $f_{im\text{-}start}$ of the subcarrier having the lowest frequency among the subcarriers of said $L_i$ resource blocks allocated to the same terminal, said frequency $f_{im\text{-}start}$ satisfying to $f_{im\text{-}start}=f_{jm}+(kN)*f_j+\Delta_{ij}$, with k a positive integer, and determine a frequency $f_{im\text{-}end}$ of the subcarrier having the highest frequency among the subcarriers of said $L_i$ resource blocks allocated to the same terminal, said frequency $f_{im\text{-}end}$ satisfying to $f_{im\text{-}end}=f_{im\text{-}start}+(L_iN-1)*f_i$, and d) transmitting a resource indication value RIV to the at least one terminal, said RIV being a function a specified position of a first resource block and the number $L_i$ of resource blocks.

13. A transmitter according to claim 12, comprising a memory unit storing, for each couple of possible values of a number $NRB_{start}^{(j)}$ and said $L_i$ a unique resource tart indication value RIV, $NRB_{start}^{(j)}$ being a maximum number of resource blocks comprising N subcarriers of the first subcarrier spacing configuration $f_j$, having a subcarrier with a lower frequency than said frequency $f_{im\text{-}start}$ that are allowable in said carrier during a time period of a resource block comprising N subcarriers of said first subcarrier spacing configuration $f_j$, and wherein said transmitter is further configured to:

provide the RIV when the allocation of resource blocks to the same terminal defined by the couple of $L_i$ and $NRB_{start}^{(j)}$ is performed, and transmit the RIV to said given terminal.

14. A terminal comprising a processor to use a carrier according to a resource allocation being performed in said carrier, said resource allocation having been carried out according to claim 1, said terminal, being configured to use at least a number $L_i$ of resource blocks comprising N subcarriers of said second subcarrier spacing configuration $f_i$, comprises:

a communication module configured to receive an allocation resource block information through a control channel, indicating an allocation of at least a number $L_i$ of resource blocks allocated to the terminal and comprising N subcarriers of said second subcarrier spacing configuration $f_i$, a processing module which is configured to determine the resource blocks that are allocated to said terminal according to the allocation resource block information, wherein the processing module is configured to determine said resource block allocated to the terminal:

as having the frequency $f_{im\text{-}start}$ of the subcarrier having the lowest frequency among the subcarriers of said $L_i$ resource blocks allocated to the same terminal, said frequency $f_{im\text{-}start}$ satisfying to $f_{im\text{-}start}=f_{jm}+(kN)*f_j+\Delta_{ij}$, with k a positive integer, and as having the frequency $f_{im\text{-}end}$ of the subcarrier having the highest frequency among the subcarriers of said $L_i$ resource blocks allocated to the same terminal, said frequency $f_{im\text{-}end}$ satisfying to $f_{im\text{-}end}=f_{im\text{-}start}+(L_iN-1)*f_i$.

15. A terminal according to claim 14, wherein said terminal further comprises a memory unit storing for each couple of possible values of a number $NRB_{start}^{(j)}$ and said $L_i$ a unique resource indication value RIV, $NRB_{start}^{(j)}$ being a maximum number of resource blocks comprising N subcarriers of the first subcarrier spacing configuration $f_j$ having a subcarrier with a lower frequency than said frequency $f_{im\text{-}start}$ that are allowable in said carrier during a time period of a resource block comprising N subcarriers of said first subcarrier spacing configuration $f_j$, and wherein said processing module is configured to read said memory unit and determine the couple values $L_i$ and $NRB_{start}^{(j)}$, upon reception of an RIV value in said allocation resource block information.

16. A non-transitory computer readable medium having stored there in a computer program product comprising code instructions to perform the method according to claim 1, when said instructions are run by a processor.

* * * * *